(12) United States Patent
Hanington (10) Patent No.: US 6,967,274 B2
(45) Date of Patent: Nov. 22, 2005

(54) SYSTEM AND METHOD FOR TEACHING MUSIC

(75) Inventor: Darlene Hanington, Glenn Heights, TX (US)

(73) Assignee: Stephanie Ross, Sandy, UT (US)

( * ) Notice: Subject to any disclaimer, the term of this patent is extended or adjusted under 35 U.S.C. 154(b) by 127 days.

(21) Appl. No.: 10/630,370

(22) Filed: Jul. 29, 2003

(65) Prior Publication Data

US 2005/0022653 A1 Feb. 3, 2005

(51) Int. Cl.$^7$ .............................................. G09B 15/02
(52) U.S. Cl. ..................... 84/476; 84/470 R; 84/477 R; 84/471 R; 84/483.2; 84/484
(58) Field of Search ............................ 84/476, 470 R, 84/471 R, 477 R, 483.2, 484

(56) References Cited

U.S. PATENT DOCUMENTS

| | | | |
|---|---|---|---|
| 1,319,919 A * | 10/1919 | Barker | 84/471 R |
| 3,817,145 A * | 6/1974 | Cohen | 84/471 R |
| 3,955,466 A | 5/1976 | Goldmark | 84/470 R |
| 4,012,979 A | 3/1977 | Wemekamp | 84/613 |
| 4,295,408 A | 10/1981 | Pasker | 84/484 |
| 4,321,853 A | 3/1982 | Tumblin | 84/454 |
| 4,351,215 A | 9/1982 | van der Bruggen | 84/714 |
| 5,597,968 A | 1/1997 | Okamoto | 84/470 R |
| 5,949,010 A | 9/1999 | Hacker | 84/476 |
| 6,015,947 A | 1/2000 | Moberg | 84/471 R |
| 6,031,172 A | 2/2000 | Papadopoulos | 84/470 R |
| 6,211,451 B1 | 4/2001 | Tohgi et al. | 84/470 R |
| 6,215,057 B1 | 4/2001 | Oren-Chazon | 84/470 R |
| 6,271,453 B1 | 8/2001 | Hacker | |
| 6,337,434 B2 | 1/2002 | Oren-Chazon | |
| 6,388,182 B1 | 5/2002 | Bermudez | |
| 6,452,081 B1 | 9/2002 | Ravagni et al. | |
| 6,506,969 B1 | 1/2003 | Baron | |

OTHER PUBLICATIONS

Roe, "Note Values Music Blocks," The Artist Magazine, Nov. 1985.

* cited by examiner

*Primary Examiner*—Shih-Yung Hsieh
(74) *Attorney, Agent, or Firm*—Clayton, Howarth & Cannon, P.C.

(57) ABSTRACT

A system and method for teaching music both visually and tactilely. In one embodiment, the invention comprises blocks shaped to resemble musical symbols used to compose music, including time signatures, notes, rests, and dots. Each of the blocks are relative in thickness such that for a given time signature, the correct rhythm for a given measure can be determined by laying one or more of the notes, rests and dots one over the other to see if their combined thickness is equal to that of a preselected time signature. The thickness of the block shaped to resemble the time signature is such that it only allows the correct number of blocks shaped as notes, rests or dots to be of equal thickness to thereby determine the correct rhythm. In addition, the correct rhythm can be determined by simply reading the shaped blocks as one would read music. The use of the shaped blocks having relative thicknesses allows a student to learn rhythm by trial and error and does not necessarily require that the student understand complex music theory. In addition, the blocks can be used by the student when clapping the correct rhythms. Other musical notation can be represented by blocks as well such as bar lines and slurs.

18 Claims, 12 Drawing Sheets

SYSTEM AND METHOD FOR TEACHING MUSIC

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. The Field of the Invention

The present invention relates generally to systems and methods for teaching music, and more particularly, but not necessarily entirely, to a structure utilized to readily teach a student the correct rhythm for a measure in a given time signature.

2. Description of Related Art

One of the most difficult concepts to master when learning to read and play music is that of rhythm. Rhythm is generally referred to as the pattern of musical movement through time. This concept is especially difficult for children, who may have difficulty understanding the abstract concepts of music theory which encompass note reading and even mathematics to some degree. In a musical piece, the rhythm is principally determined by the time signature and note values selected by the composer at the time the piece was created. The time signature is typically located in the first measure of a musical piece. The time signature comprises two separate values, often indicated as one number placed over another number. In simple time, the top number indicates the number of beats per measure while the bottom number indicates the note value that will receives one beat. Note values typically comprise whole notes, half notes, quarter notes, sixteenth notes, etc. Therefore the time signature three-four time indicates that each measure has three beats and that each beat is occupied by a quarter note. Notice that the four symbolizes the quarter note because it is ¼ of the whole note.

Traditionally, rhythm has been taught to children in various methods. The most common method is by having an instructor clap a rhythm and having the students repeat the rhythm while clapping. This can be done while listening to a musical piece or reading the music from a sheet. In addition, the explanation of rhythm from the pie chart has also been used. In this method, a whole pie is drawn and shown to the students as representing a whole note. It is then explained that cut in half, the pieces represent two half notes. This demonstration can continue to explain quarter notes and so on. Another teaching method for rhythm employs paper and pencil. This includes having the students fill in blank musical measures with the appropriate note values such that the correct rhythm is ascertained.

The prior art is thus characterized by several disadvantages that are addressed by the present invention. The present invention minimizes, and in some aspects eliminates, the above-mentioned failures, and other problems, by utilizing the methods and structural features described herein.

The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the invention will become apparent from a consideration of the subsequent detailed description presented in connection with the accompanying drawings in which.

DETAILED DESCRIPTION OF THE EMBODIMENTS

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

It must be noted that, as used in this specification and the appended claims, the singular forms "a," "an," and "the" include plural referents unless the context clearly dictates otherwise. Thus, for example, reference to a note may include one or more notes. In describing and claiming the present invention, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

By way of overview and understanding of the general concepts of the present invention and in no way limiting, the present invention comprises a system and method for helping music students, especially children, to understand rhythm through tactile and visual representation. In one embodiment of the present invention, the system comprises a plurality of blocks shaped like musical notation that might be found in sheet music, including time signatures, notes, rests and other music symbols. The blocks representing time signatures, notes and rests are proportional in thickness to each other such that a student can easily determine the correct rhythm for a measure of music with a given time signature by either reading the music blocks in the traditional manner or by comparison of the thicknesses of the note and rest blocks to the thickness of the selected time signature. When a combination of note blocks and rest blocks laid on top of each other equal the height of a preselected time signature block, then the student knows that the correct rhythm has been found. The student quickly learns that different combinations of notes and rests can be used in a measure while maintaining the correct rhythm. Further, because the notes are like a puzzle, the student can rearrange the blocks until the correct rhythm is obtained by trial and error.

In addition, because the blocks are shaped to resemble actual musical notation, i.e. time signatures, notes and rests, the correct rhythm can also be determined by "reading" the notes as would be done with sheet music. The student can also learn by clapping the rhythm created with the blocks with or without the help of an instructor. Thus, it will be appreciated that the present invention is advantageous over the previously available systems and methods by allowing a music student to learn by, among other things, touching, seeing and hearing.

Different embodiments of the invention will now be described with the aid of the accompanying drawings.

In one embodiment of the invention, a system for teaching rhythm comprises a plurality of blocks shaped as varying types of musical notation. The blocks are preferably comprised of thermoplastic which can be created by an injection molding process. It will be appreciated that blocks comprised of thermoplastic are significantly superior to the wood blocks as previously disclosed in the art. Thermoplastic blocks ensures that the proper block thickness is obtained, unlike wood blocks, which varied from block to block due to the sanding process. Further, blocks comprised of thermoplastic also have the advantage that they do not need to be painted as do wood blocks. Also, blocks comprised of thermoplastic are less likely to be damaged or broken during use.

In general, the blocks of the system may be divided into three different types, master blocks, cadence blocks, and notation blocks. Each of these will be described in detail below.

Master Blocks

The term "master block" as used herein refers to blocks that indicate both visually and tactilely a time signature. A time signature typically comprises an upper value and a lower value when printed on a music sheet. The time signature appears as a fraction in some cases. In simple time, the upper value indicates the number of beats per measure. The lower value indicates the note receiving one beat. For example, in 4/4 time, which is also commonly written as "four-four time," each measure receives four beats and the quarter note is allocated one beat.

As mentioned above, a master block may indicate a time signature in two ways, visually and tactilely. Visual indication encompasses the reading of the time signature from a symbol or text conveyed by the master block. In one embodiment, the master block is shaped to resemble a time signature which can be easily read. Alternatively, a master block may have the time signature printed, etched or printed as text on the block which can also be read.

Tactile indication of the time signature involves a control reference feature. The control reference feature is a physical characteristic of a master block having a dimension that is used to represent the time signature visually indicated by the block. The control reference feature may be the thickness, length, height, width of any side of the master block.

It is important to note that the dimension of the control reference feature may be arbitrarily chosen if the dimension of the control reference features of any other master blocks has not been established. It is typical to establish the dimension of the control reference feature of one of the master blocks. This dimension ca be referred to as the benchmark dimension. Once established, the benchmark dimension can be used as a benchmark by which the dimensions of the control reference features of the other master blocks are determined. Further, as will be described below, the dimensions of the cadence blocks also depend on the benchmark dimension.

Again, once the benchmark dimension has been established for a control reference feature in any master block, the dimensions of the control reference features of the other master blocks follow automatically. For example, if the control reference feature dimension for a master block representing a four-four time signature is set, it follows that the dimension of the control reference feature of a master block representing a three-four time signature is three-quarters that of the four-four time block. This also holds true for two-four time block, whose control reference feature dimension feature would be one-half that of that of a four-four time block.

In general, the most popular time signatures include four-four time, three-four time, two-four time, and six-eight time. The preceding list is not meant to be comprehensive but is presented for illustrative purposes only. Other time signatures as known to those skilled in the art that are not mentioned are also within the scope of the present invention.

Figure 1A:
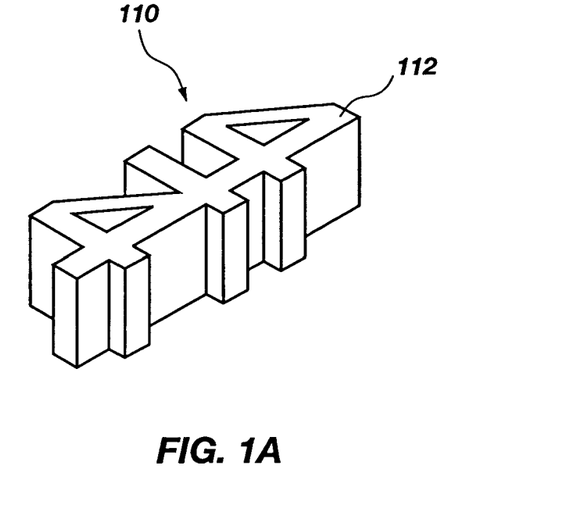
FIGS. 1A and 1B are schematic views of a four-four time signature block.

An illustrative four-four time signature block 110 is shown in FIG. 1A. The four-four time signature block 110 is configured in shape to resemble the appearance of a four-four time signature as would be observed on a sheet of music. In particular, the top surface 112 and bottom surface 113 (shown in FIG. 1B) has an upper "4" over a lower "4" which are separated by a line.

Figure 1B:
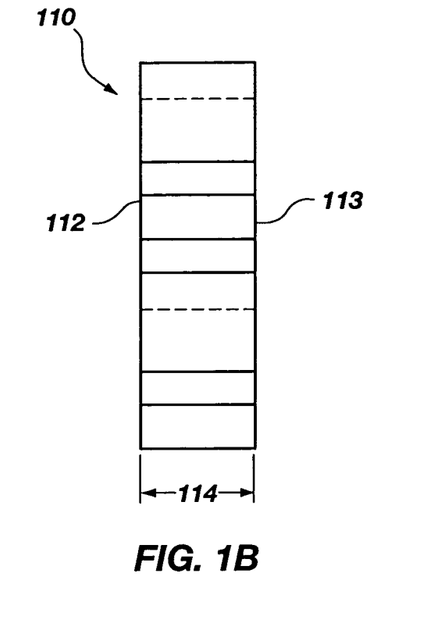

As can be seen in FIG. 1B, the thickness of the block between the top surface 112 and the bottom surface 113 is shown generally by the double ended arrow marked by the reference numeral 114. The thickness of the four-four time signature block 110 is the control reference feature. In one embodiment, the thickness of the block is about 1.25 inches.

Figure 2A:
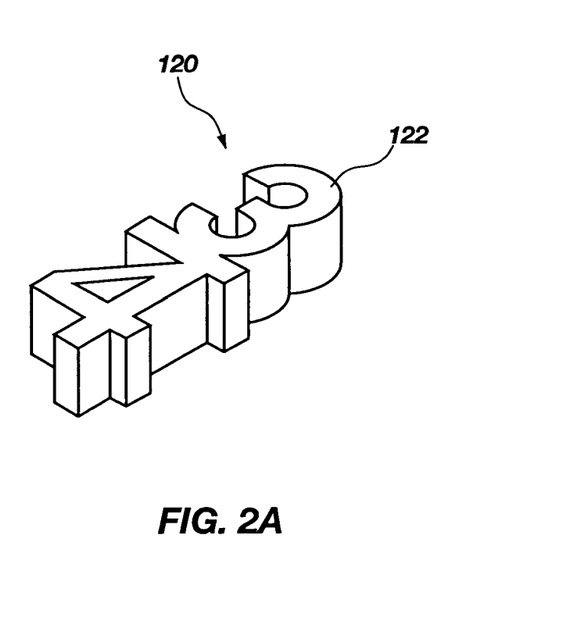
FIGS. 2A and 2B are schematic views of a three-four time signature block.

An illustrative three-four time signature block 120 is generally shown in FIG. 2A. The three-four time signature block 120 is configured in shape to resemble the appearance of a three-four time signature as would be observed on a sheet of music. In particular, the top surface 122 and bottom surface 123 (shown in FIG. 2B) have an upper numeral "3" over a lower numeral "4" which are separated by a line.

Figure 2B:
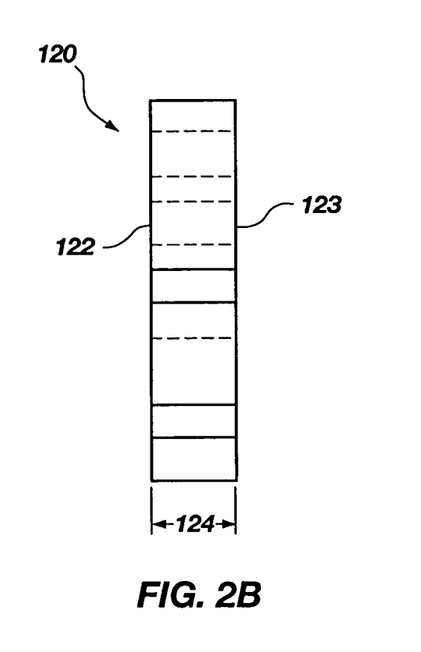

The thickness of the three-four time signature block 120 between the top surface 122 and the bottom surface 123, is generally shown by the double arrow represented by the reference numeral 124, is determined in proportion to the thickness of the four-four time signature block 110, assuming that the control reference feature of the four-four time signature block is the benchmark. Since a three-four time signature block 120 indicates three beats per measure, its thickness should be three-quarters of the thickness of the four-four time signature. In the case of the embodiment wherein the four-four time signature block 110 has a thickness of about 1.25 inches, the three-four time signature block 120 would have a thickness of about 0.94 inches.

Figure 3A:
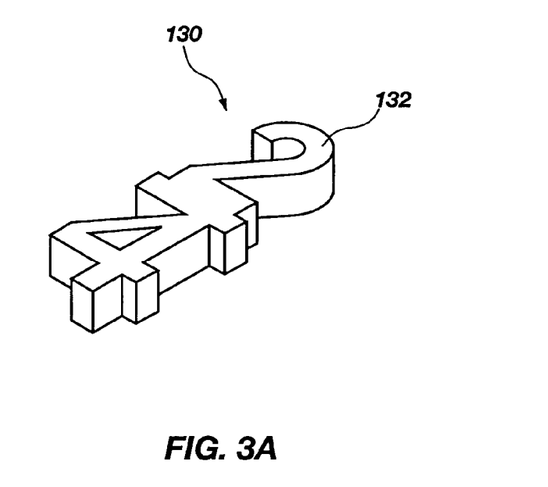
FIGS. 3A and 3B are schematic views of a two-four time signature block.

An illustrative two-four time signature block 130 is generally shown in FIG. 3A. The two-four time signature block 130 is configured in shape to resemble the appearance of a two-four time signature as would be observed on a sheet of music. In particular, the top surface 132 and the bottom surface 133 (shown in FIG. 3B) has an upper numeral "2" over a lower numeral "4" which are separated by a line.

Figure 3B:
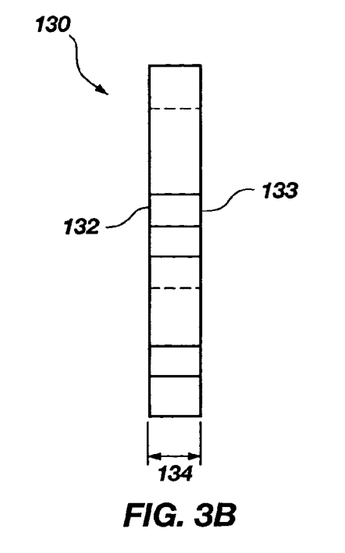

The thickness of the two-four time signature block 130 between the top surface 132 and the bottom surface 133, is generally represented by the double arrow marked as reference numeral 134 in FIG. 3B, can be determined in proportion to the thickness of the four-four time signature block 110. Since a two-four time signature block 130 indicates two beats per measure, its thickness should be two-fourths or one-half of the thickness of the four-four time signature. In the case of the embodiment wherein the four-four time signature block 110 has a thickness of about 1.25 inches, the two-four time signature block 130 would have a thickness of about 0.625 inches.

Figure 4A:
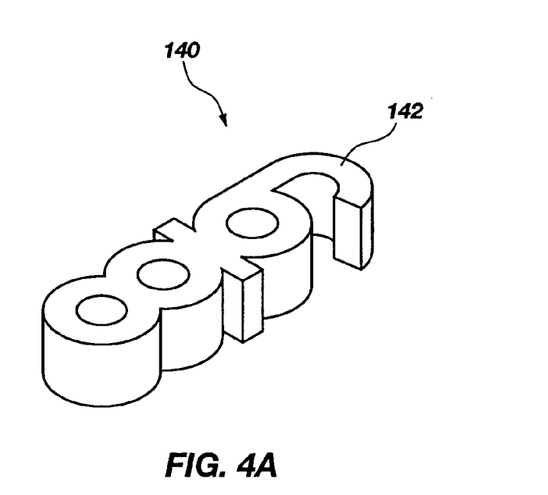
FIGS. 4A and 4B are schematic views six-eight time signature block.

An illustrative six-eight time signature block 140 is generally shown in FIG. 4A. Six-eight time signature is known as a compound signature. The six-eight time signature block 140 is configured in shape to resemble the appearance of a six-eight time signature as would be observed on a sheet of music. In particular, the top surface 142 and the bottom surface 143 (shown in FIG. 4B) has an upper numeral "6" over a lower numeral "8" which are separated by a line.

Figure 4B:
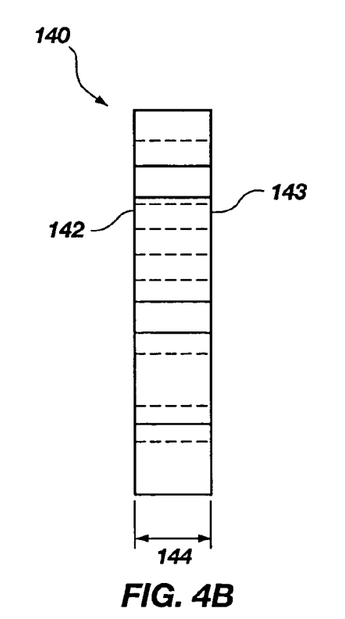

The thickness of the six-eight time signature block 140 between the top surface 142 and the bottom surface 143, generally represented by the double arrow marked with the reference numeral 144 in FIG. 4B, is determined in proportion to the thickness of the four-four time signature block 110. Since a six-eight time signature block 140 indicates six beats per measure with an eighth note receiving one beat, its thickness should be 6/8 or 3/4 of the thickness of the four-four time signature. In the case of the embodiment wherein the four-four time signature block 110 has a thickness of about 1.25 inches, the six-eight time signature block 140 would have a thickness of about 0.94 inches.

It should be noted other time signatures as commonly known in the art are possible as well. It is within the scope of this invention that these other time signatures be formed as blocks. Further, it is not necessary that the time signatures be of a particular style, and in fact it is within the scope of this invention that the numbers can be of varying styles.

Cadence Blocks

As the term is used herein, "cadence blocks" refers to blocks that indicate a relative duration value for a note or a rest both visually and tactilely for a given time signature. Further, cadence blocks includes blocks that indicate a change in the duration value of a note, such as a dot. Visual indication of the duration value encompasses the reading of the duration value as would be done on a sheet of music. This is accomplished by a note or rest value represented in or on the cadence block. Symbols for note and rest values are well known in the art. Note values such as whole notes, half notes, quarter notes, eighth notes and sixteenth notes each have known duration values for a given time signature. In addition, rest values such as whole rests, half rest, quarter rests, eighth rests and sixteenth rests also have known duration values for a given time signature. Dots are placed next to a note to indicate that the note receives one and one-half its duration value.

In one embodiment of the present invention, the cadence blocks are shaped to resemble a note value or a rest value. Alternatively, a cadence block may have the note value or rest value printed or otherwise etched on it. In either of these manners, the duration value can be visually ascertained.

Tactile indication of the duration value involves a reference feature on each of the cadence blocks. As with the master blocks, a reference feature for a cadence block is a physical characteristic that is proportional in dimension to the duration value represented by the block for a given time signature. The reference feature may be thickness, length, height, width or any other physical characteristic of the cadence block which has a dimension.

In determining the correct rhythm for a measure, the reference feature(s) of one or more cadence blocks is/are compared to the reference feature of a master block having a given time signature. In the case where the reference features of the master and cadence blocks is the thickness, the correct rhythm is ascertained by laying the selected cadence blocks one on top of the other to see if their combined thickness equals that of the master block. If the combined thicknesses for the selected cadence block(s) is equal to that of the master block, then the student knows that the selected cadence blocks are of the correct rhythm.

As stated above, common note values include whole notes, half notes, quarter notes, eighth notes and sixteenth notes. The preceding list is not meant to be comprehensive, and other note values are within the scope of the present invention.

Figure 5A:
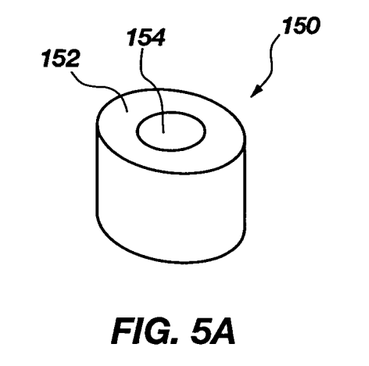
FIGS. 5A and 5B are schematic views of a whole note block.

An illustrative whole note block 150 is shown in FIG. 5A. The whole note block 150 is configured in shape to resemble the appearance of a whole note as would be observed on a sheet of music. A top surface 152 and a bottom surface (shown in FIG. 5B) of the whole note block 150 are generally oval shaped. An orifice 154 extending from the top surface 152 to the bottom surface, most easily observed in FIG. 1B, is located in the center of the top surface 152.

Figure 5B:
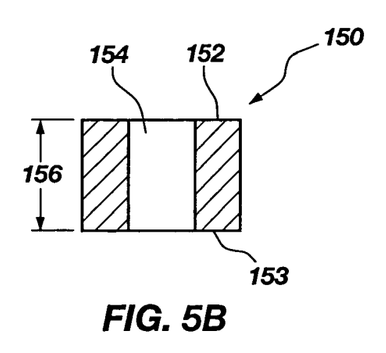

The thickness of the whole note block 150 between the top surface 152 and the bottom surface 153, generally represented by the double arrow marked with the reference numeral 156 in FIG. 5B, is determined in proportion to the thickness of the four-four time signature block 110. Since a whole note comprises four quarter notes, in four-four time it can easily be determined that the thickness of the whole note block 150 should be the same as the four-four time signature block 110. In the case of the embodiment wherein the four-four time signature block 110 has a thickness of about 1.25 inches, the whole note block 150 would have a thickness of about 1.25 inches.

Figure 6A:
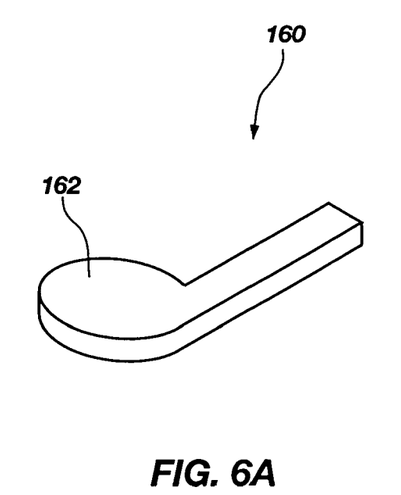
FIGS. 6A and 6B are schematic views of a quarter note block.

An illustrative quarter note block 160 is shown in FIG. 6A. The quarter note block 160 is configured in shape to resemble the appearance of a quarter note as would be observed on a sheet of music. A top surface 162 and a bottom surface (shown in FIG. 6B) of the quarter note block 160 comprise a solid oval shaped bottom with an attached tail.

Figure 6B:
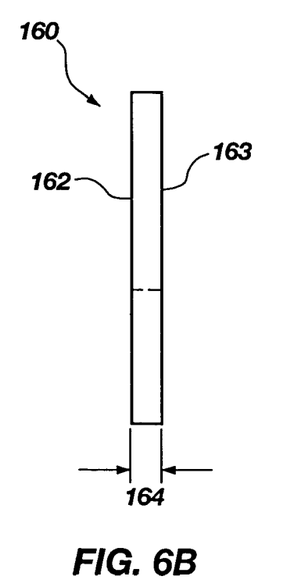

The thickness of the quarter note block 160 between its top surface 162 and bottom surface 163, generally represented by the arrows marked with the reference numeral 164 in FIG. 6B, is determined in proportion to the thickness of the four-four time signature block 110. Since a quarter note receives one beat and because there are four beats in a measure in four-four time, the thickness of the quarter note block 160 should be ¼ that of the four-four time signature block 110. In the case of the embodiment of the invention wherein the four-four time signature block 110 has a thickness of about 1.25 inches, the quarter note block 160 would have a thickness of about 0.313 inches.

Figure 7A:
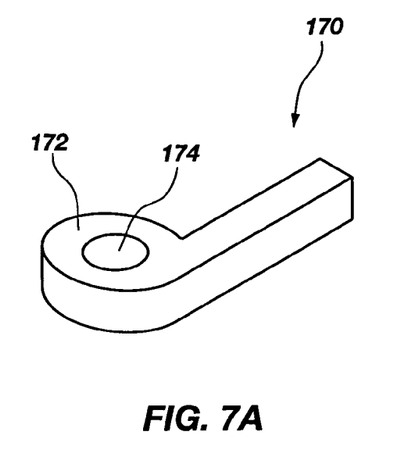
FIGS. 7A and 7B are schematic views of a half note block.

An illustrative half note block 170 is shown in FIG. 7A. The half note block 170 is configured in shape to resemble the appearance of a half note as would be observed on a sheet of music. A top surface 172 and a bottom surface 173 (shown in FIG. 7B) of the half note block 170 comprise an oval shaped bottom with an attached tail. In the center of the oval shaped bottom, an orifice 174 extends from the top surface to the bottom surface.

Figure 7B:
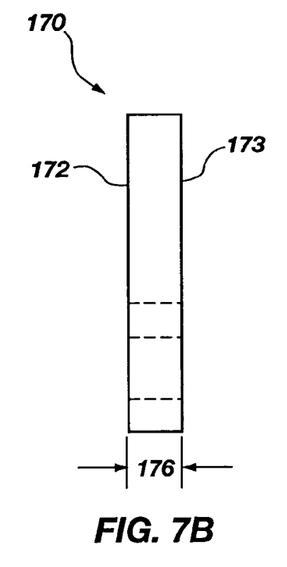

The thickness of the half note block 170 between the top surface 172 and the bottom surface 173, generally represented by the arrows marked with the reference numeral 176 in FIG. 7B, is determined in proportion to the thickness of the four-four time signature block 110. Since a half note receives two beats and because there are four beats in a measure in four-four time, the thickness of the half note block 170 should be ½ that of the four-four time signature block 110. In the case of the embodiment of the invention wherein the four-four time signature block 110 has a thickness of about 1.25 inches, the half note block 170 would have a thickness of about 0.625 inches.

Figure 8A:
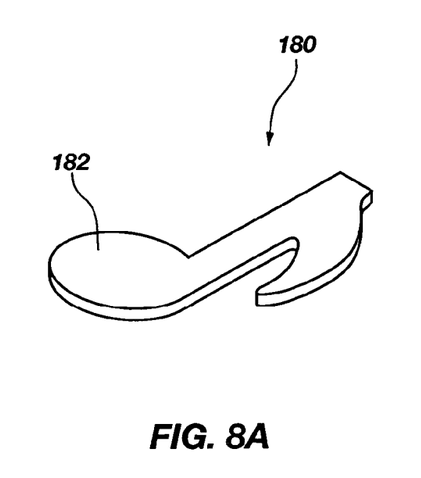
FIGS. 8A and 8B are schematic views of an eighth note block.

An illustrative eighth note block 180 is shown in FIG. 8A. The eighth note block 180 is configured in shape to resemble the appearance of an eighth note as would be observed on a sheet of music. In particular, a top surface 182 and a bottom surface 183 (shown in FIG. 8B) of the eighth note block 180 comprise an oval shaped bottom with an attached tail with an attached curlie.

Figure 8B:
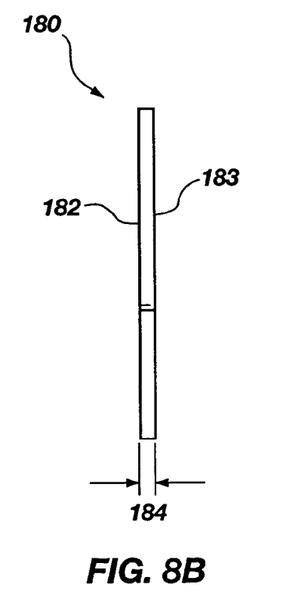

The thickness of the eighth note block 180 between the top surface 182 and the bottom surface 183, generally represented by the arrows marked with the reference numeral 184 in FIG. 8B, is determined in proportion to the thickness of the four-four time signature block 110. Since an eighth note receives one-half of a beat and because there are four beats in a measure in four-four time, the thickness of the eighth note block 180 should be ⅛ that of the four-four time signature block 110. In the case of the embodiment wherein the four-four time signature block 110 has a thickness of about 1.25 inches, the eighth note block 180 would have a thickness of about 0.156 inches.

Like notes, rests also have a relative duration value for a given time signature. Rests include, without limitation, whole note rests, half note rests, quarter note rests, eighth note rests and sixteenth note rests. Other rest values as known to those skilled in the art are also within the scope of the present invention. Rests typically indicate the relative duration for which no music is played.

Figure 9A:
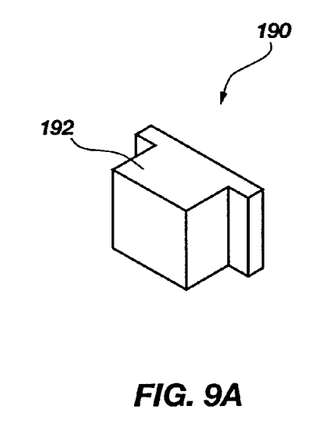
FIGS. 9A and 9B are schematic views of a whole note rest block.

An illustrative whole note rest block 190 is shown in FIG. 9A. The whole note rest block 190 is configured in shape to resemble the appearance of a whole note rest as would be observed on a sheet of music. In particular, a top surface 192 and a bottom surface 193 (shown in FIG. 9B) of the whole note rest block 190 comprise a first rectangular portion along with a second rectangular, the second rectangular portion representing part of the staff line.

Figure 9B:
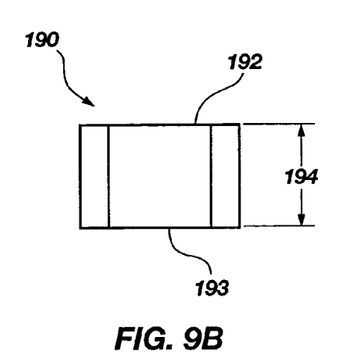

The thickness of the whole note rest block 190 between the top surface 192 and the bottom surface 193, generally represented by the double arrow marked with the reference numeral 194 in FIG. 9B, is determined in proportion to the thickness of the four-four time signature block 110. Since a whole note rest receives four beats and because there are four beats in a measure in four-four time, the thickness of the whole note rest block 190 should be equal to that of the four-four time signature block 110. In the case of the embodiment wherein the four-four time signature block 110 has a thickness of about 1.25 inches, the whole note rest block 190 would have a thickness of about 1.25 inches.

Figure 10A:
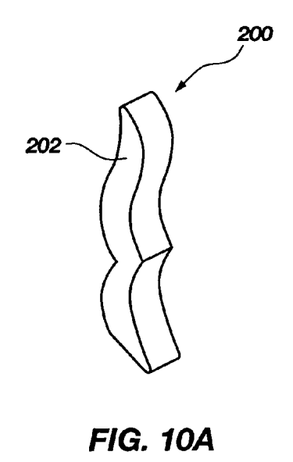
FIGS. 10A and 10B are schematic views of quarter note rest block.

An illustrative quarter note rest block 200 is shown in FIG. 10A. The quarter note rest block 200 is configured in shape to resemble the appearance of a quarter note rest as would be observed on a sheet of music. A top surface 202 and a bottom surface 203 (shown in FIG. 10B) of the quarter note rest block 200 comprise two curved lines meeting at each end.

Figure 10B:
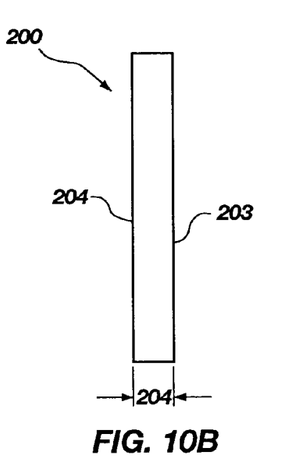

The thickness of the quarter note rest block 200 between its top surface 202 and its bottom surface 203, generally represented by the arrows marked with the reference numeral 204 in FIG. 10B, is determined in proportion to the thickness of the four-four time signature block 110. Since a quarter note rest receives one beat and because there are four beats in a measure in four-four time, the thickness of the quarter note rest block 200 should be ¼ that of the four-four time signature block 110. In the case of the embodiment wherein the four-four time signature block 110 has a thickness of about 1.25 inches, the quarter note rest block 200 would have a thickness of about 0.313 inches.

Figure 11A:
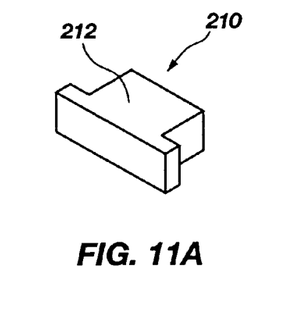
FIGS. 11A and 11B are schematic views of a half note rest block.

An illustrative half note rest block 210 is shown in FIG. 11A. The half note rest block 210 is configured in shape to resemble the appearance of a half note rest as would be observed on a sheet of music. A top surface 212 and a bottom surface 213 (shown in FIG. 11B) of the half note rest block 210 comprise two rectangular portions.

Figure 11B:
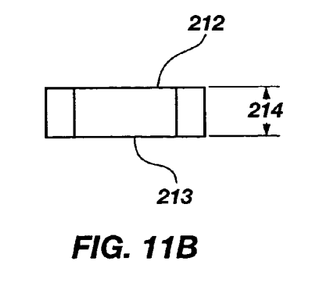

The thickness of the half note rest block 210 between the top surface 212 and the bottom surface 213, generally represented by the arrows marked with the reference numeral 214 in FIG. 11B, is determined in proportion to the thickness of the four-four time signature block 110. Since a half note rest receives two beats and because there are four beats in a measure in four-four time, the thickness of the half note rest block 210 should be ½ that of the four-four time signature block 110. In the case of the embodiment wherein the four-four time signature block 110 has a thickness of about 1.25 inches, the half note rest block 210 would have a thickness of about 0.625 inches.

Figure 12A:
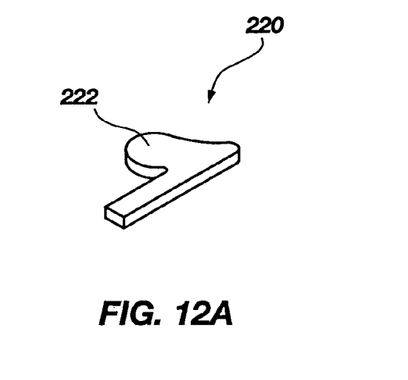
FIGS. 12A and 12B are schematic views of an eighth note rest block.

An illustrative eighth note rest block 220 is shown in FIG. 12A. The eighth note rest block 220 is configured in shape to resemble the appearance of an eighth note rest as would be observed on a sheet of music. In particular, a top surface 222 and a bottom surface 223 (shown in FIG. 12B) of the eighth note rest block 220 comprise a swooped portion with an attached tail.

Figure 12B:
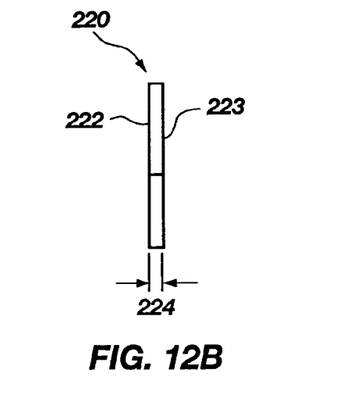

The thickness of the eighth note rest block 220 between the top surface 222 and the bottom surface 223, generally represented by the arrows marked with the reference numeral 224 in FIG. 12B, is determined in proportion to the thickness of the four-four time signature block 110. Since an eighth note rest receives one-half of a beat and because there are four beats in a measure in four-four time, the thickness of the eighth note rest block 220 should be ⅛ that of the four-four time signature block 110. In the case of the embodiment wherein the four-four time signature block 110 has a thickness of about 1.25 inches, the eighth note rest block 220 would have a thickness of about 0.156 inches.

A dot is used to lengthen the relative duration of a note by one half of its normal duration. On a sheet of music, a dot is placed directly after the note. In a four-four time signature a dotted half note receives three beats, a dotted quarter note receives one and a half beats and a dotted eighth note receives three quarters of a beat.

Figure 13A:
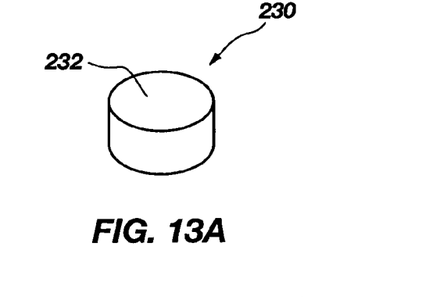
FIGS. 13A and 13B are a schematic view of a ¼ dot block.

An illustrative quarter dot block 230 is shown in FIG. 13A. The quarter dot block 230 is configured in shape to resemble the appearance of a dot as would be observed on a sheet of music. A top surface 232 and a bottom surface 233 (shown in FIG. 13B) of the quarter dot block 230 comprise a round circle.

Figure 13B:
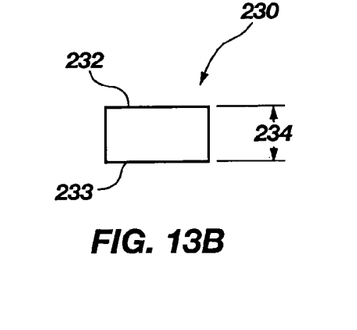

The thickness of the quarter dot block 230, generally represented by the double arrow marked with the reference numeral 234 in FIG. 13B, should be the same thickness as that of a quarter note block 160 for a given time signature. In the case of the embodiment wherein the four-four time signature block 110 has a thickness of about 1.25 inches, the quarter dot block 230 would have a thickness of about 0.313 inches, the same thickness that a quarter note block 160 would have.

Figure 14A:
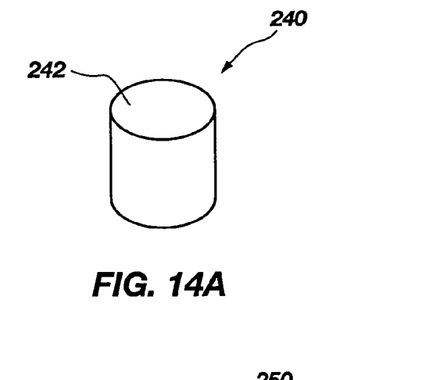
FIGS. 14A and 14B are a schematic view of a ½ dot block.

An illustrative half dot block 240 is shown in FIG. 14A. The half dot block 240 is configured in shape to resemble the appearance of a dot as would be observed on a sheet of music. A top surface 242 and a bottom surface 243 (shown in FIG. 14B) of the half dot block 240 comprise a round circle.

Figure 14B:
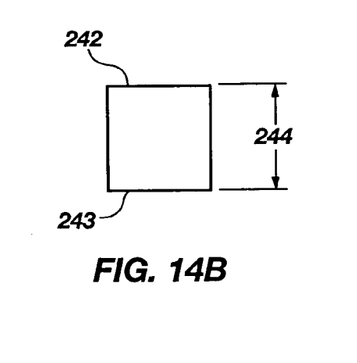

The thickness of the half dot block 240, generally represented by the double arrow marked with the reference numeral 244 in FIG. 14B, should be the same thickness as that of a half note block 170 for a given time signature. In the case of the embodiment wherein the four-four time signature block 110 has a thickness of about 1.25 inches, the half dot block 240 would have a thickness of about 0.625 inches, the same thickness that a half note block 170 would have.

Figure 15A:
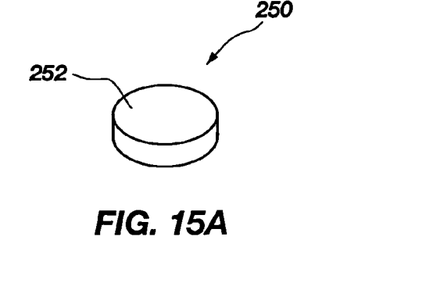
FIGS. 15A and 15B are schematic views of a ⅛ dot block.

An illustrative eighth dot block 250 is shown in FIG. 15A. The eighth dot block 250 is configured in shape to resemble the appearance of a dot as would be observed on a sheet of music. A top surface 252 and a bottom surface 253 (shown in FIG. 15B) of the eighth dot block 250 comprise a round circle.

Figure 15B:
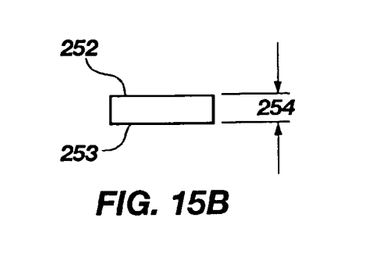

The thickness of the eighth dot block 250 between the top surface 252 and the bottom surface 253, generally represented by the arrows marked with the reference numeral 254 in FIG. 15B, should be the same thickness as that of an eighth note block 180 for a given time signature. In the case of the embodiment wherein the four-four time signature block 110 has a thickness of about 1.25 inches, the eighth dot block 250 would have a thickness of about 0.156 inches, the same thickness that an eighth note block 180 would have.

Notation Blocks

As the term is used herein, "notation block" refers to any block representing visually any musical symbol used in writing music other than time signatures, notes and rests. These musical symbols may include, without limitation, slurs and bar lines. Other musical symbols that are also within the scope of the present invention include, without limitation ties, bar lines, repeat dots, accidentals, staccato mark, tenuto mark, accent mark, and hair pins.

A slur is a curved line placed over or under notes of different pitch. It indicates that the notes contained within the slur are to be played smoothly (Legato). For example, wind instrument players play these notes in one continuous breath with only the first note tongued.

Figure 16A:
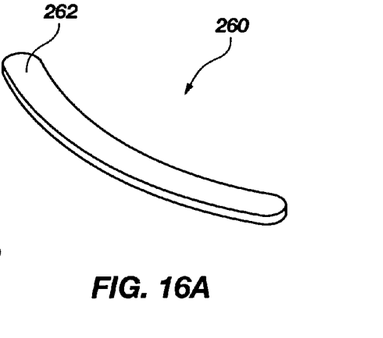
FIGS. 16A and 16B is a schematic view of a slur line block.

An illustrative slur block 260 is shown in FIG. 16A. The slur block 260 is configured in shape to resemble the appearance of a slur as would be observed on a sheet of music. A top surface 262 and a bottom surface 263 (shown in FIG. 16B) of the slur block 260 are each formed by a curved line of arbitrary thickness.

Figure 16B:
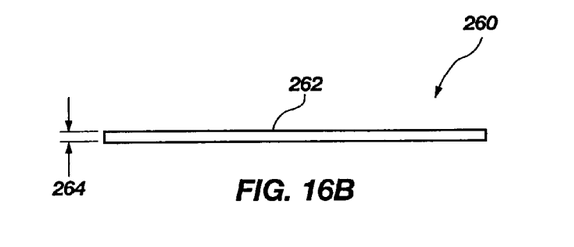

The thickness of the slur block 260 between the top surface 262 and the bottom surface 263, generally represented by the arrows marked with the reference numeral 264 in FIG. 16B, is arbitrary since a the thickness of a slur block 260 is not compared to any other blocks. In one embodiment of the invention the thickness of the slur block 260 is 0.125 inches.

Figure 17A:
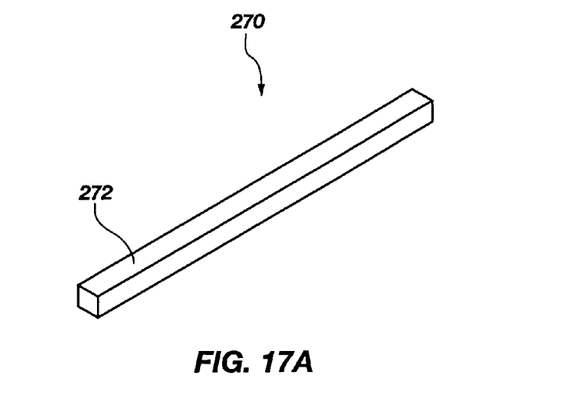
FIGS. 17A and 17B is a schematic view of a bar line block.

A bar line is used to indicate the end of a measure. An illustrative bar line block 270 is shown in FIG. 17A. The bar line block 270 is configured in shape to resemble the appearance of a bar line as it would be observed on a sheet of music. A top surface 272 and a bottom surface 273 (shown in FIG. 17B) of the bar line block 270 are each formed by a straight line of arbitrary thickness.

Figure 17B:
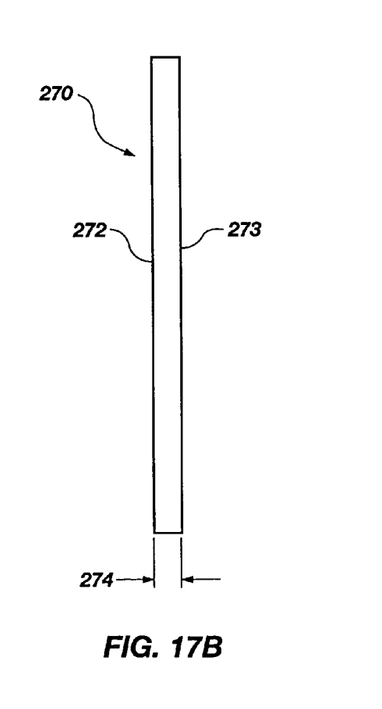

The thickness of the bar line block 270 between the top surface 272 and the bottom surface 273, generally represented by the arrows marked with the reference numeral 274 in FIG. 17B, is arbitrary since the thickness of a bar line block 270 is not compared to any other blocks. In one embodiment of the invention the thickness of the bar line block 270 is about 0.38 inches.

Figure 18A:
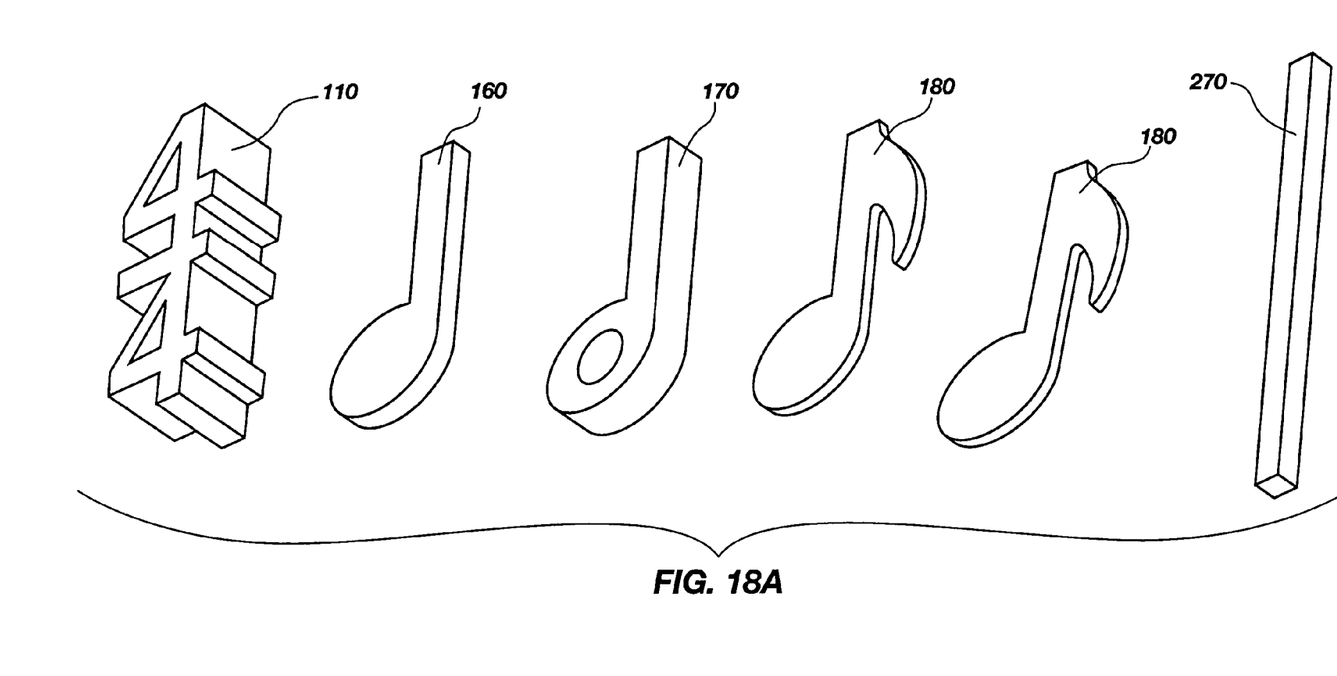
FIGS. 18A, 18B, and 18C illustrate examples of how the present invention visually and tactilely teach the correct rhythm for a given time signature.

FIGS. 18A, 18B, 18C and 19 illustrate examples of how the present invention may be used to both visually and tactilely find the correct rhythm for a given time signature. This example should not be construed as limiting the scope of the present invention, but only one of the possible arrangements for carrying out the present invention. In FIG. 18A, a master block, four cadence blocks, and a notation block are arranged to represent one measure. The master block in this case is a four-four time signature block 110. The four cadence blocks are a quarter note block 160, a half note block 170, two eighth note blocks 180. The notation block is a bar line block 270. As mentioned, the various blocks in FIG. 18A have been arranged to represent one measure. When read from left to right, the master block is first, followed by the cadence blocks and then the notation block.

The blocks can be visually read to determine the correct rhythm as is well known in the art. This is simply reading the blocks as if it were a sheet of music. In particular, the four-four time signature block 110 indicates that there are four beats per measure and that a quarter note receives one beat. From this information, it can be determined that the quarter note block 160 represents one beat, the half note block 170 receives two beats, and the two eighth note blocks 180 each receive one-half of a beat, for a total of four beats, which is the correct rhythm for a measure having four-four time. The bar line block 270 serves to indicate the end of the measure.

Figure 18B:
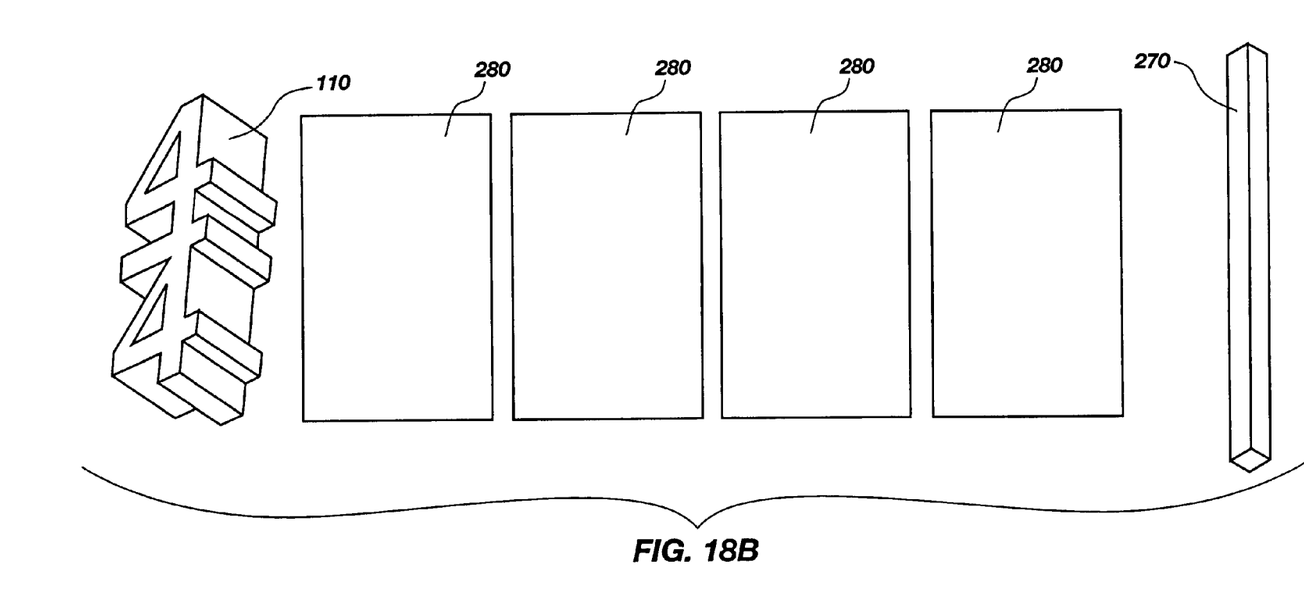

FIG. 18B illustrates the use of beat mats 280. Each beat mat 280 is used to represent one beat in a measure. In four-four time, four beat mats 280 are used to illustrate each beat as shown in FIG. 18B. A beat mat 280 can be of any size, but in one embodiment the beat mat is two inches by three inches. Typically, the beat mats 280 are made from material, but may be made from any material, including without limitation plastic, paper, or foam. Before laying down the cadence blocks, the beat mats 280 can be laid down to form a measure along with a time signature block and a bar line block 270. The use of the beat mats helps the student when choosing and placing the cadence blocks.

Figure 18C:
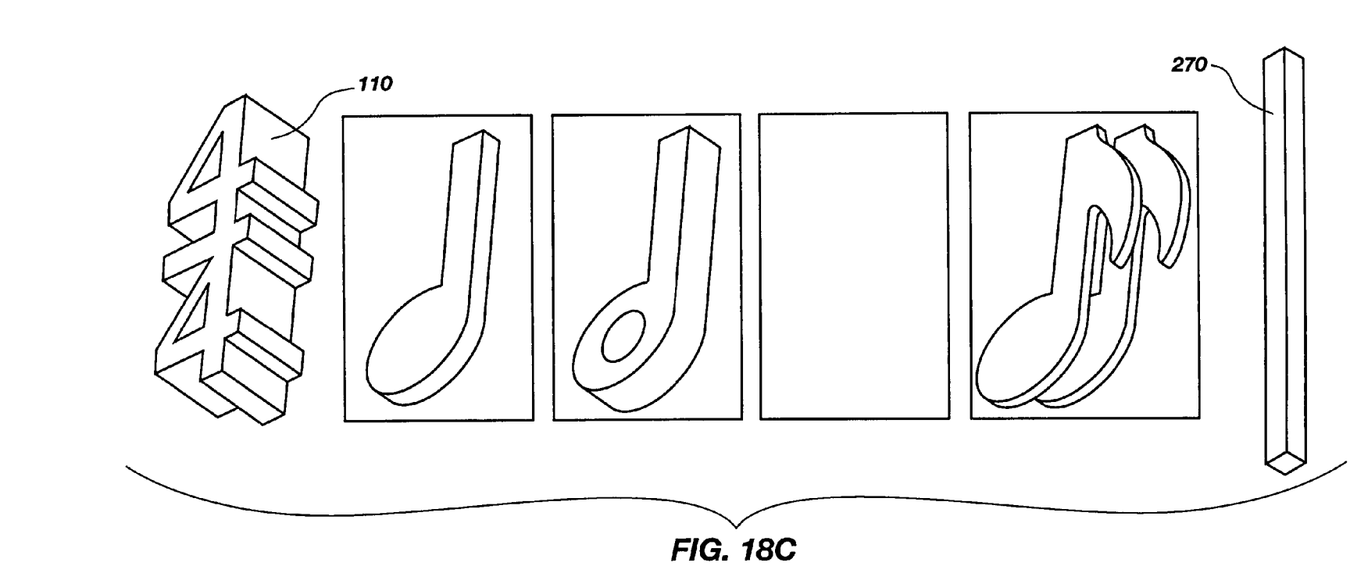

FIG. 18C illustrates the same time signature and cadence blocks as used in FIG. 18A, with the inclusion of several beat mats 280 as shown in FIG. 18B. Cadence blocks equaling one beat are placed on each mat. For cadence blocks receiving more than one beat, the block may be laid on the first mat and leaving the second mat open or the block may be laid across both mats.

Figure 19:
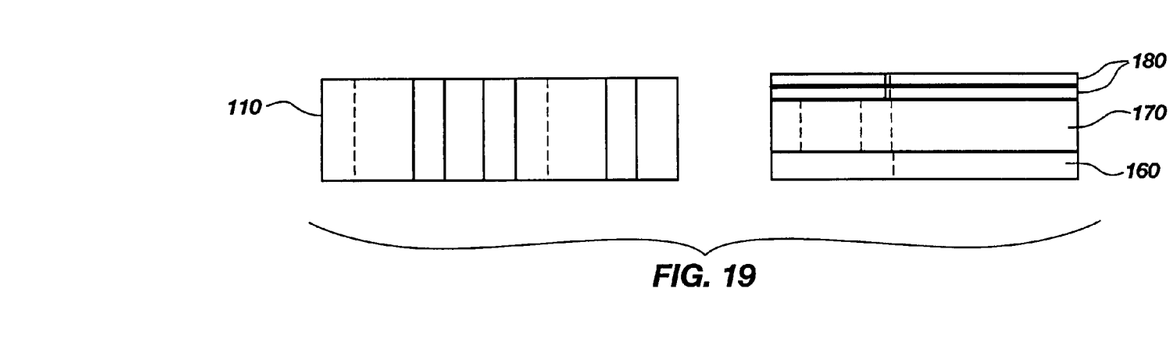
FIG. 19 is a side view of various blocks showing the relationship between various blocks including master and cadence blocks.

FIG. 19 illustrates the tactile use of the blocks to determine the correct rhythm by using the reference features of the master and cadence blocks. In this case, the reference feature of the blocks is the thickness of the blocks. FIG. 19 illustrates the same blocks as represented in FIG. 18. The quarter note block 160, half note block 170, and the two eighth note blocks 180 have all been laid one over the other. The combined thickness of these blocks is equal to that of the four-four time signature block 110. Because the thicknesses are equal, this indicates that the rhythm of the measure is correct. If the rhythm was incorrect, then the heights would not be equal. The bar line block 270 (see FIG. 18) is not used because it is a notation block which has no direct impact on the rhythm.

It will be appreciated from the above provided example that the present invention can be used to both visually and tactilely teach rhythm. This allows students who do not know how to read music to easily determine the correct rhythm for a measure for a given time signature by a comparison.

It should also be noted that systems illustrative of the present invention can comprise any number of blocks as long as there is at least one master block and sufficient cadence blocks to find the correct rhythm for a measure of music. A system therefore could comprise as few as two blocks. There is no upper limit, however, on the number of blocks that can be included in a system. A system within the scope of the present invention could include enough blocks to find the rhythm of a entire musical composition, for example.

Also, the measurements and dimensions of the blocks noted herein may not be required to the exact numerical precision as stated but it is the impression provided to a student that is important. For example, it is not necessary that a block be exactly three-quarters the height of another block. Slight variances due to manufacturing tolerances are acceptable. It is only necessary that a student perceive tactilely that the block is three-quarters the height.

Figure 20:
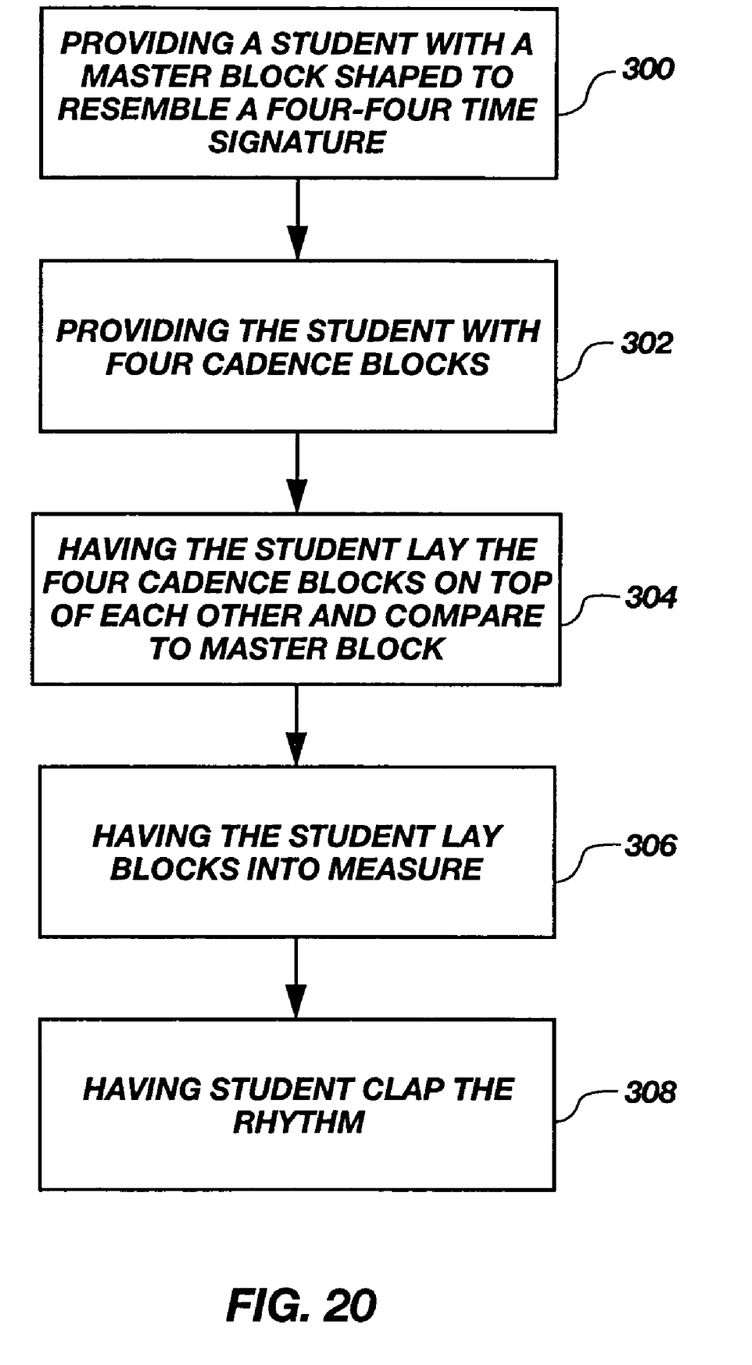
FIG. 20 is an examplary flow diagram of a method for teaching musical rhythm.

Reference will now be made to the exemplary flow diagram of FIG. 20. In one illustrative embodiment of the present invention there is represented a method to teach musical rhythm. The first step is to provide a student with at least one master block shaped to resemble four-four time signature (step 300). The next step is to provide the student with four cadence blocks shaped to resemble quarter notes (step 302). The student is then instructed to lay the four cadence blocks one on top of the other and compare their thickness to that of the master block (step 304). Once the student understands this principle, the student is then instructed to lay all of the blocks out in a measure (step 306). The student then performs the correct rhythm, for example by clapping (step 308).

Figure 21:
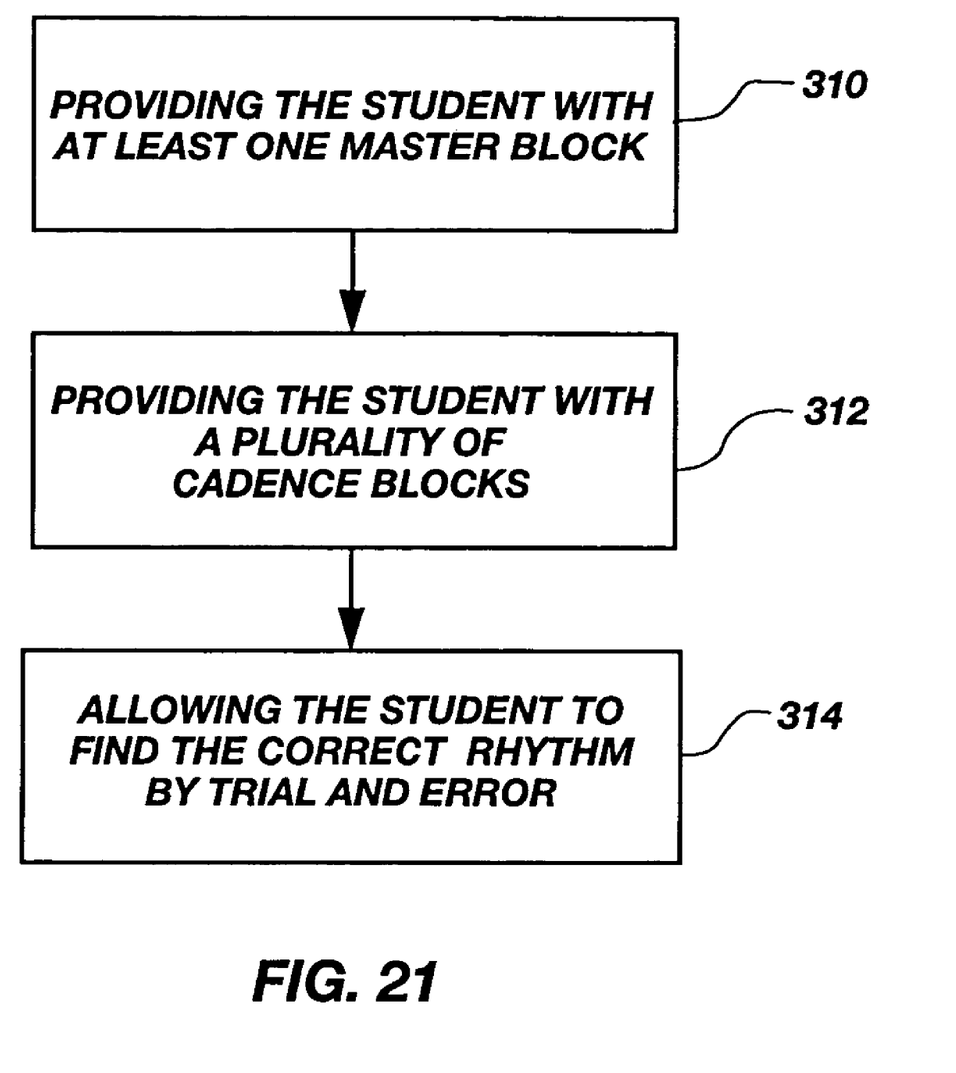
FIG. 21 is an examplary flow diagram showing another method for teaching musical rhythm.

Reference will now be made to the exemplary flow diagram of FIG. 21. In this illustrative embodiment of the present invention there is represented a method to teach musical rhythm. The first step is to provide a student with at least one master block (step 310). The next step is to provide the student with a plurality of cadence blocks (step 312). The student is allowed by trial and error to find the correct rhythm for a measure of music using both visual and tactile methods (step 314).

Those having ordinary skill in the relevant art will appreciate the advantages provided by the features of the present invention. For example, the use of blocks to both visually and tactilely teach rhythm is an improvement over the prior art. Another feature of the present invention is to construct the blocks from thermoplastic, thereby assuring that each block is of the correct thickness as well as limit the damage to the blocks during use. It is a further feature of the present invention, in accordance with one aspect thereof, to provide blocks shaped as dots, slurs and bar lines, none of which is found in prior art.

In the foregoing Detailed Description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus, the following claims are hereby incorporated into this Detailed Description by this reference, with each claim standing on its own as a separate embodiment of the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A system for teaching musical rhythm, said system comprising:
   a block shaped to resemble a time signature;
   a plurality of blocks shaped to resemble notes; and
   a plurality of beat mats;
   wherein the plurality of beat mats are laid out to indicate a correct number of beats in a measure for the time signature.

2. The system of claim 1 wherein the time signature is four-four time.

3. The system of claim 1 wherein the block shaped to resemble a time signature and each of the plurality of blocks shaped to resemble notes each have a first side having a thickness, wherein the thickness of the first side of the block shaped to resemble a time signature is such that only a group of the plurality of blocks having the correct rhythm will be of equal combined thickness.

4. The system of claim 1 further comprising a block shaped to resemble a bar line.

5. The system of claim 4 further comprising a block shaped to resemble a slur.

6. The system of claim 1 further comprising at least one block shaped to resemble a rest.

7. The system of claim 1 further comprising at least one block shaped to resemble a dot.

8. A system for teaching musical rhythm, said system comprising:
   at least one block that visually indicates a time signature;
   at least one block that visually indicates a musical note; and
   a plurality of beat mats;
   wherein the plurality of beat mats are laid out to indicate a number of beats in a measure for a given time signature.

9. The system of claim 8 wherein each block that visually indicates a time signature has a thickness proportional to its indicated time signature.

10. The system of claim 8 wherein each of the at least one block visually indicating a musical note has a thickness proportional to a beat value of its indicated musical note.

11. The system of claim 8 further comprising a block visually indicating a bar line.

12. The system of claim 8 further comprising a block visually indicating a slur.

13. The system of claim 8 further comprising at least one block visually indicating a rest.

14. The system of claim 8 further comprising at least one block visually indicating a dot.

15. The system of claim 8 wherein each of the at least one block that visually indicates a time signature is shaped to resemble its indicated time signature.

16. The system of claim 15 wherein each of the at least one block that visually indicates a musical note is shaped to resemble its indicated musical note.

17. The system of claim 16 wherein each of the at least one block that visually indicates a time signature has a thickness proportional of its indicated time signature.

18. The system of claim 17 wherein each of the at least one block visually indicating a musical note has a thickness proportional to a beat value of its indicated musical note.

* * * * *